United States Patent [19]
Kitagawa et al.

[11] Patent Number: 5,051,321
[45] Date of Patent: Sep. 24, 1991

[54] SOLID OXIDE FUEL CELL AND METHOD OF MANUFACTURING THE SAME

[75] Inventors: Niroh Kitagawa; Masayuki Kitoh, both of Tokyo, Japan

[73] Assignee: Onoda Cement Company, Ltd., Onoda, Japan

[21] Appl. No.: 557,527

[22] Filed: Jul. 24, 1990

[51] Int. Cl.⁵ .............................................. H01M 8/12
[52] U.S. Cl. ..................................... 429/30; 427/115; 29/623.5
[58] Field of Search ................... 429/30, 33; 29/623.5; 427/115

[56] References Cited

U.S. PATENT DOCUMENTS

| | | |
|---|---|---|
| 3,219,730 | 11/1965 | Bliton et al. ............................ 429/30 |
| 3,460,991 | 8/1969 | White ..................................... 429/30 |
| 3,464,861 | 9/1969 | Williams et al. ....................... 429/30 |
| 4,562,124 | 12/1985 | Ruka ................................... 429/33 X |
| 4,702,971 | 10/1987 | Isenberg ............................ 429/33 X |
| 4,812,329 | 3/1989 | Isenberg ............................ 429/33 X |

Primary Examiner—Stephen J. Kalafut
Attorney, Agent, or Firm—Price, Heneveld, Cooper, DeWitt & Litton

[57] ABSTRACT

Disclosed are a solid oxide fuel cell and a method of manufacturing the same. An electrolyte layer of the solid oxide fuel cell unit is formed by spray coating the layer on a substrate having a coefficient of thermal expansion which is substantially equal to that of the electrolyte layer, and the formed layer is then subjected to heat treatment.

11 Claims, 1 Drawing Sheet

SOLID OXIDE FUEL CELL AND METHOD OF MANUFACTURING THE SAME

BACKGROUND OF THE INVENTION

1. Field of the Invention

The present invention relates to a solid oxide fuel cell and a method of manufacturing the same.

2. Description of the Related Art

A solid oxide fuel cell comprises, as shown in FIG. 1, a first region 8 filled with a fuel gas 6, a second region 9 filled with air or oxygen 7, and a solid oxide fuel cell unit 5 separating these regions. When the unit 5 and the gases in the regions 8 and 9 are heated to a temperature, e.g., 1000°C., above which ionic conduction by oxygen occurs in an electrolyte layer 3 of the unit 5, electromotive force is generated between a fuel electrode layer 2 and an air electrode layer 4, both within the unit 5, whereby the cell generates electrical energy supplied via conductor 10 to load 11. The electrolyte layer 3 is required to possess good oxygen ion conductivity, and gas stopping power which hardly permits gas to pass therethrough.

The gas stopping power is required from such an electrolyte layer because, if part of the fuel gas in the fuel gas region transmits through the electrolyte layer to reach the air or oxygen region, or conversely if part of the oxygen gas reaches the fuel gas region through the layer, there is the risk of a combustion reaction between the fuel gas and the oxygen gas. In such cases, part of the fuel gas will be consumed, becoming unable to participate in the generation of power. This leads to a drop in power generation efficiency.

Another problem is that the heat of combustion causes local heating of the cell, resulting in breakage of the unit, etc.

The electrolyte layer is formed by one of the following methods:

① A method (CVD-EVD method) in which zirconium chloride and yttrium chloride are transformed into their gaseous state at a high temperature and under a reduced pressure, the gases reacting with water vapor to deposit an electrolyte layer. This method will hereinafter be referred to as "the gaseous phase method".

② A method in which an electrolyte powder is spray coated to form an electrolyte layer. This method will hereinafter be referred to as "the conventional spray coating method".

Although the known gaseous phase method is capable of obtaining an electrolyte layer having great gas stopping power, the speed at which the layer is formed is as low as to be about one hundredth (1/100) of that in the conventional spray coating method. Furthermore, the first method requires strict reaction conditions consisting of a temperature ranging from 1100° to 1200° C., and a degree of vacuum of about 1 Torr (1 Torr=1 mmHg), hence, it requires a large apparatus. Still further, since the zirconium chloride and the yttrium chloride are used as being mixed with helium gas, while the vapor used is mixed with hydrogen, the required running cost is high, and it is also necessary to assure safety.

Another drawback of the gaseous phase method is that since it involves a process performed under reduced pressure, the apparatus used cannot be an apparatus for continuous production but only an apparatus for batch production. Because production by a batch type apparatus requires a long time to raise or lower the temperature, the production efficiency is low. As a result, the fuel cell units obtained are extremely expensive. Thus, the first method is only scarcely suitable for practical use.

Although the conventional spray coating method is capable of forming an electrolyte layer at high speed, the produced layer has insufficient gas stopping power. As a result, the fuel cell units obtained may suffer from local heating due, for instance, to gas leakage, and end up with a short service life. Thus, the second method also fails to be adequately usable in practice.

The gas stopping power questioned here is evaluated in terms of the gas permeability coefficient P ($cm^4$/g·sec) by using a certain measuring device whose basic construction is shown in FIG. 2.

First, a predetermined pressure is applied to a pressurizing region 16 of the device. Then, the quantity Q of gas 13 ($cm^3$/sec) which reaches a discharge region 17 of the device after passing through an electrolyte layer 3 formed on a porous substrate 1 is measured by a gas flowmeter 14.

When the type as well as the temperature of the gas are fixed, the quantity Q ($cm^3$/sec) of the transmitted gas changes in inverse proportion to the thickness t (cm) 12 of the electrolyte layer, and in direct proportion to both the difference Pd ($g/cm^2$) in pressure between the pressurizing region 16 and the discharge region 17, measured by pressure gauge 15 and the area S ($cm^2$) of the electrolyte layer. On the basis of these facts, the gas permeability coefficient P ($cm^4$/g·sec) can be calculated from the following equation:

$$Q = P \times \frac{Pd \times S}{t}$$

The electrolyte layer should have as small a gas permeability coefficient P as possible.

SUMMARY OF THE INVENTION

If an electrolyte layer is formed on a substrate having a coefficient of thermal expansion substantially equal to that of the electrolyte layer by a plasma spray coating process, and is then subjected to heat treatment at a temperature above 1300° C. for a predetermined period of time, it is possible to form an electrolyte layer having a gas permeability coefficient which is far smaller than that of an electrolyte layer formed by a method consisting of only a spray coating process. The present invention is directed to the provision of a solid oxide fuel cell having a solid oxide fuel cell unit including such an electrolyte layer, and a method of manufacturing the electrolyte layer.

Figure 1:
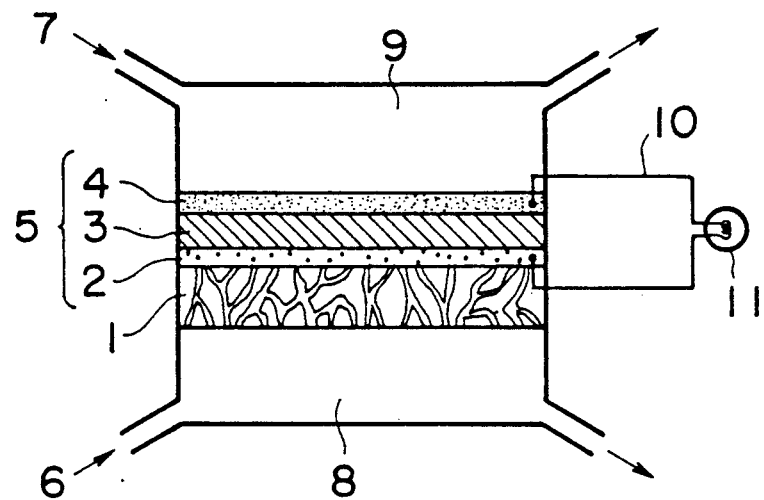
FIG. 1 is a schematic drawing of the structure of a solid oxide fuel cell.
Figure 2:
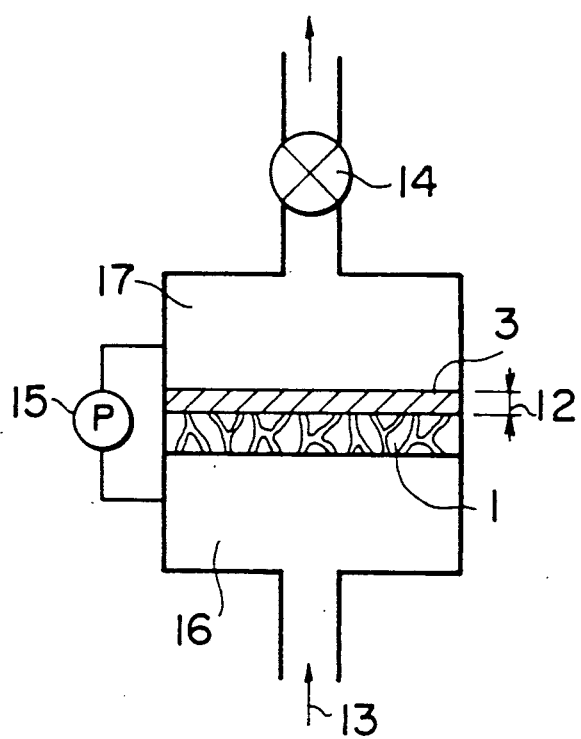
FIG. 2 is a schematic drawing of the structure of a device for measuring the gas permeability coefficient of an electrolyte layer.

DESCRIPTION OF THE PREFERRED EMBODIMENTS.

The present invention will now be described by way of examples.

EXAMPLE 1

Plasma spray coating was effected to form an electrolyte layer of yttria-stabilized zirconia (yttria: 8 mol. %)

on a porous substrate of calcia-stabilized zirconia (calcia 10 mol. %). The temperature of the formed electrolyte layer was raised to 1450° C. at an increment rate of 50° C./hour. Then, the layer was maintained at that temperature for six hours. Thereafter, the temperature of the layer was lowered at a reduction rate of 50° C./hour.

A second electrolyte layer was obtained in exactly the same manner except that it was subjected to only the plasma spray coating.

The gas permeability coefficient of the first electrolyte layer which was subjected to both the plasma spray coating and the heat treatment, and that of the second electrolyte layer which was subjected to only the plasma spray coating were measured using nitrogen gas at 25° C. As a result, the layer which was only plasma spray coated had a gas permeability coefficient of $3.0 \times 10^{-6}$ cm$^4$/g·sec, whereas the layer which was plasma spray coated and then heat treated had a gas permeability coefficient of $0.6 \times 10^{-6}$ cm$^4$/g·sec. Thus, it was found that the heat treatment enabled a five-to-one (1/5) reduction in the gas permeability coefficient.

EXAMPLE 2

A third electrolyte layer, which was plasma spray coated and then heat treated, as well as a fourth electrolyte layer, which was only plasma spray coated, were obtained under exactly the same conditions as in Example 1 except that porous alumina substrates were used. When their gas permeability coefficients were measured, the third electrolyte layer had a gas permeability coefficient which was at least ten times greater than that of the fourth electrolyte layer. The reason for this fact was considered to be as follows: the thermal expansion coefficient ($8 \times 10^{-6}$) of the porous alumina substrate was so different from the thermal expansion coefficient ($10 \times 10^{-6}$) of the third electrolyte layer of yttria-stabilized zirconia that cracks were formed in the electrolyte layer which was thinner than the substrate. In fact, the formation of cracks in the electrolyte layer was confirmed by microphotography using an electron microscope.

From the results of Examples 1 and 2, it can be said that if the used substrate 1 is a substrate 1 made of a calcia-stabilized zirconia material having a thermal expansion coefficient that is of the order of $9.7 \times 10^{-6}$ and is thus substantially equal to that of the electrolyte layer to be formed, it is possible, by suitable heat treatment, to greatly reduce the gas permeability coefficient of the resultant electrolyte layer.

The heat treatment temperature can be below 1300° C. However, if the temperature is, for instance, about 1250° C., the required heat treatment period is about 100 hours, and is thus considerably long. The required heat treatment period can be curtailed with increases in the heat treatment temperature. If the heat treatment temperature is 1600° C., the required heat treatment period is about 1 hour.

The present invention makes it possible to advantageously combine a spray coating process, which is capable of layer formation at very high speeds, with a large heat treatment apparatus, which is already employed in industrial use to effect a continuous process, in order to form an electrolyte layer having great gas stopping power at low cost and with a simple apparatus.

While the present invention has been described in its preferred embodiments, it is to be understood that the invention is not limited thereto but may be practiced as modified or varied without departing from the scope of the invention which is defined by the appended claims.

What is claimed is:

1. A solid oxide fuel cell comprising:
    a substrate, said fuel cell having a fuel electrode layer, an electrolyte layer and an air electrode layer, said layers being superimposed to form an integral unit on said substrate;
    a first region filled with air or oxygen; and
    a second region filled with a fuel gas, said first and second regions being separated from each other by said fuel cell unit,
    said substrate having a coefficient of thermal expansion which is substantially equal to that of said electrolyte layer,
    said electrolyte layer having been formed by spray coating which is subsequently subjected to heat treatment.

2. A solid oxide fuel cell according to claim 1, wherein both said electrolyte layer and said substrate are formed of yttria-stabilized zirconia.

3. A solid oxide fuel cell according to claim 1, wherein said electrolyte layer is formed of yttria-stabilized zirconia, and said substrate is formed of calcia-stabilized zirconia.

4. A solid oxide fuel cell according to claim 1, wherein said electrolyte layer is formed of yttria-stabilized zirconia, and said substrate is formed of magnesia-stabilized zirconia.

5. The fuel cell as defined in claim 1, wherein said electrolyte layer has a gas permeability coefficient of approximately $0.6 \times 10^{-6}$ cm$^4$/g. sec. after said heat treating.

6. A method of manufacturing a solid oxide fuel cell consisting of a fuel electrode layer, an electrolyte layer and an air electrode layer, said layers being subsequently superimposed to form an integral unit on a substrate, providing a first region filled with air or oxygen and a second region spaced from said first region filled with a fuel gas, said regions being separated by said substrate, said method including the steps of:
    preparing a substrate having a coefficient of thermal expansion which is substantially equal to that of the electrolyte layer to be formed thereon; and
    forming said electrolyte layer by spray coating and subjecting the formed layer to heat treatment.

7. A method according to claim 6, wherein said heat treatment is effected at a temperature above 1300° C.

8. A method according to claim 6, wherein said heat treatment is effected for a period of time at least equal to 1 hour.

9. The method of manufacturing a solid oxide fuel cell as defined in claim 6, wherein said electrolyte is heat treated at a temperature of approximately 1450° C. for approximately six hours.

10. The method as defined in claim 9, further including raising the heating temperature at 50° C./hour increments until the temperature reaches 1450° C., and lowering the temperature by 50° C./hour increments after said six hours at 1450° C.

11. The method as defined in claim 6, wherein said plasma spray coating forms an electrolyte layer of yttria-stabilized zerconia on a substrate of calcia-stabilized zerconia and the electrolyte layer is heat treated at a temperature of approximately 1450° C. for approximately six hours, whereby said fuel permeability coefficient of said electrolyte layer after said heat treatment is one-fifth of the fuel permeability coefficient of said electrolyte layer before said heat treatment.

* * * * *

UNITED STATES PATENT AND TRADEMARK OFFICE
CERTIFICATE OF CORRECTION

PATENT NO.   :   5,051,321

DATED        :   September 24, 1991

INVENTOR(S)  :   Niroh Kitagawa et al.

It is certified that error appears in the above-identified patent and that said Letters Patent is hereby corrected as shown below:

Column 4, claim 11, line 62:
    "zerconia" should be --zirconia--;

Column 4, claim 11, line 63:
    "zerconia" should be --zirconia--.

Signed and Sealed this

Sixth Day of April, 1993

*Attest:*

STEPHEN G. KUNIN

*Attesting Officer*   Acting Commissioner of Patents and Trademarks

UNITED STATES PATENT AND TRADEMARK OFFICE
CERTIFICATE OF CORRECTION

PATENT NO. : 5,051,321

DATED : September 24, 1991

INVENTOR(S) : Niroh Kitagawa

It is certified that error appears in the above-identified patent and that said Letters Patent is hereby corrected as shown below:

Column 4, claim 1, line 5:
delete ", said fuel cell having" and insert therefor --;--

Column 4, claim 1, line 6:
after "an" (first occurrence) insert --air electrode layer, and an electrolyte layer, said fuel electrode layer and said air electrode layer on opposite sides of said--

Column 4, claim 1, line 6:
delete "and an air electrode layer"

Column 4, claim 1, line 8:
after "substrate" insert --, one of said fuel electrode layer and said air electrode layer being adjacent said substrate--

Column 4, claim 1, line 12:
delete "fuel cell unit" and insert therefor --substrate and said layers--

Column 4, claim 1, line 16:
after "by" insert --plasma--

Column 4, claim 1, line 18:
after "treatment" insert --, whereby said electrolyte layer has a significantly reduced gas permeability coefficient after said heat treatment thereof--

Column 4, claim 6, line 34:
delete "consisting of a" and insert therefor --comprising an air electrode layer, a fuel electrode layer, and an electrolyte layer, said--

Column 4, claim 6, line 34:
after "layer" delete ", an" and insert therefor --and said air electrode layer on opposite sides of said--

UNITED STATES PATENT AND TRADEMARK OFFICE
CERTIFICATE OF CORRECTION

PATENT NO. : 5,051,321
DATED : September 24, 1991
INVENTOR(S) : Niroh Kitagawa

It is certified that error appears in the above-identified patent and that said Letters Patent is hereby corrected as shown below:

Column 4, claim 6, line 35:
delete "and an air electrode layer";

Column 4, claim 6, lines 35 and 36:
delete "subsequently" and insert therefor --sequentially--;

Column 4, claim 6, line 37: delete "providing", and insert --one of said fuel electrode layer and air electrode layer adjacent said substrate, said cell including--.

Column 4, claim 6, line 40:
after "substrate " insert --and said layers,--;

Column 4, claim 6, line 44:
after "by" insert --plasma--;

Column 4, claim 6, line 45:
after "treatment" insert --, whereby the gas permeability coefficient of said electrolyte layer is significantly reduced.

Signed and Sealed this

Thirty-first Day of May, 1994

Attest:

BRUCE LEHMAN

*Attesting Officer*    *Commissioner of Patents and Trademarks*